Dec. 29, 1970   H. A. HERZOG ET AL   3,550,395
FLEXURAL SUPPORT STRUCTURE
Original Filed May 18, 1967   3 Sheets-Sheet 1
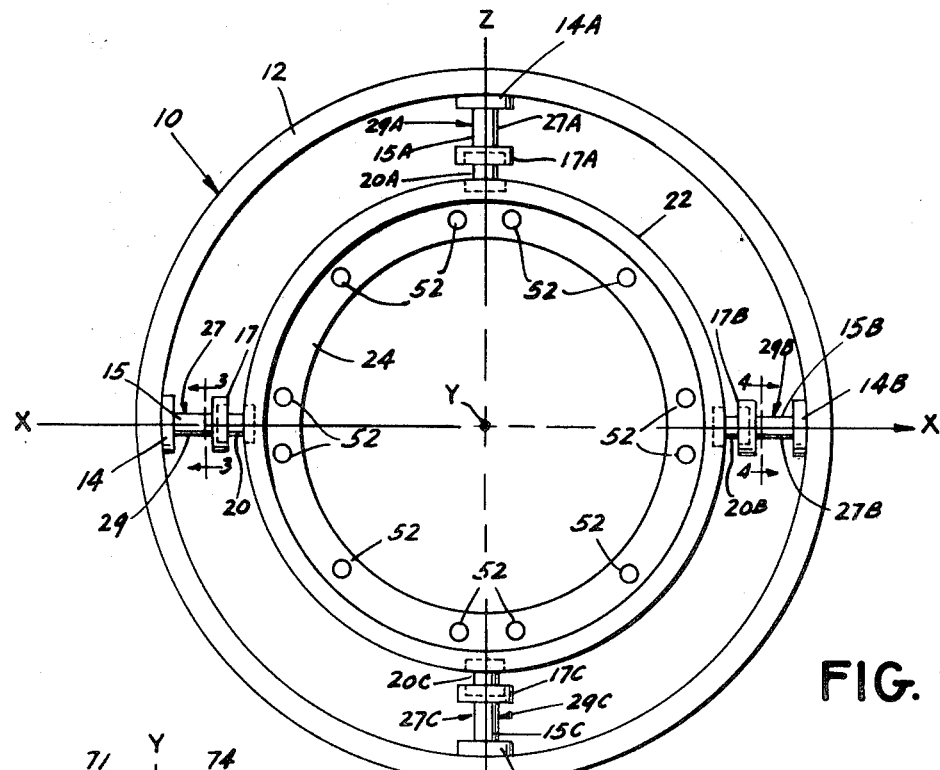
FIG. 1
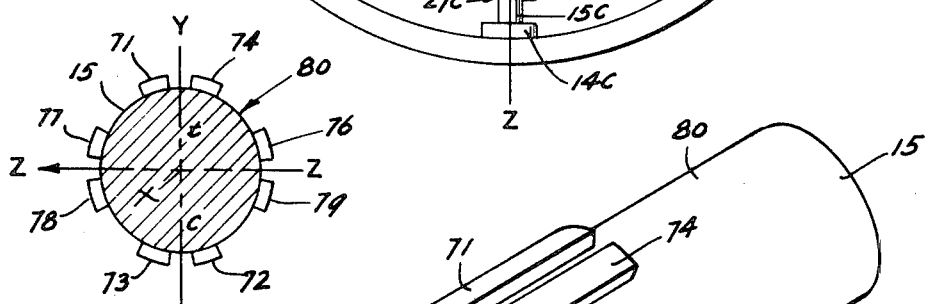
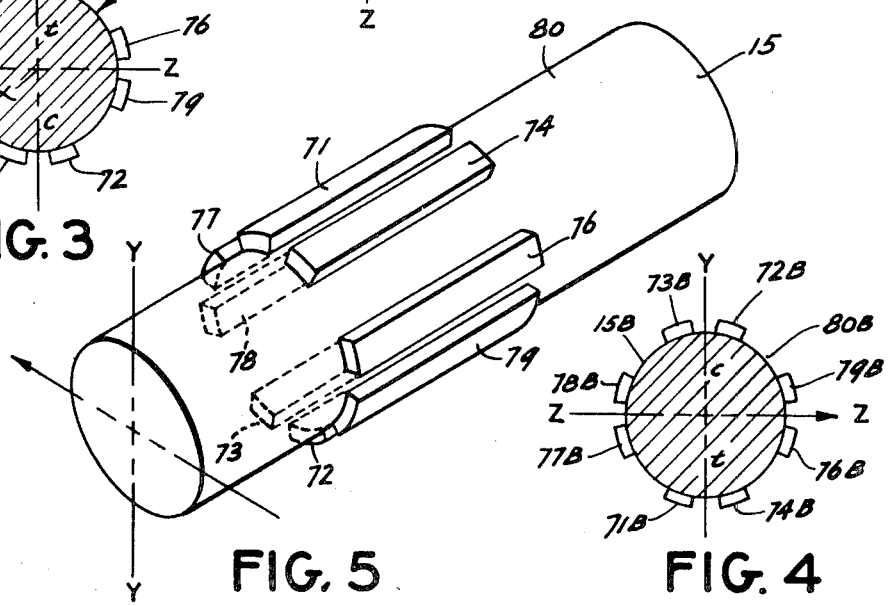
FIG. 3   FIG. 5   FIG. 4
INVENTORS
WILLIAM PACKARD
HOWARD A. HERZOG
BY Herbert L. Davis
ATTORNEY

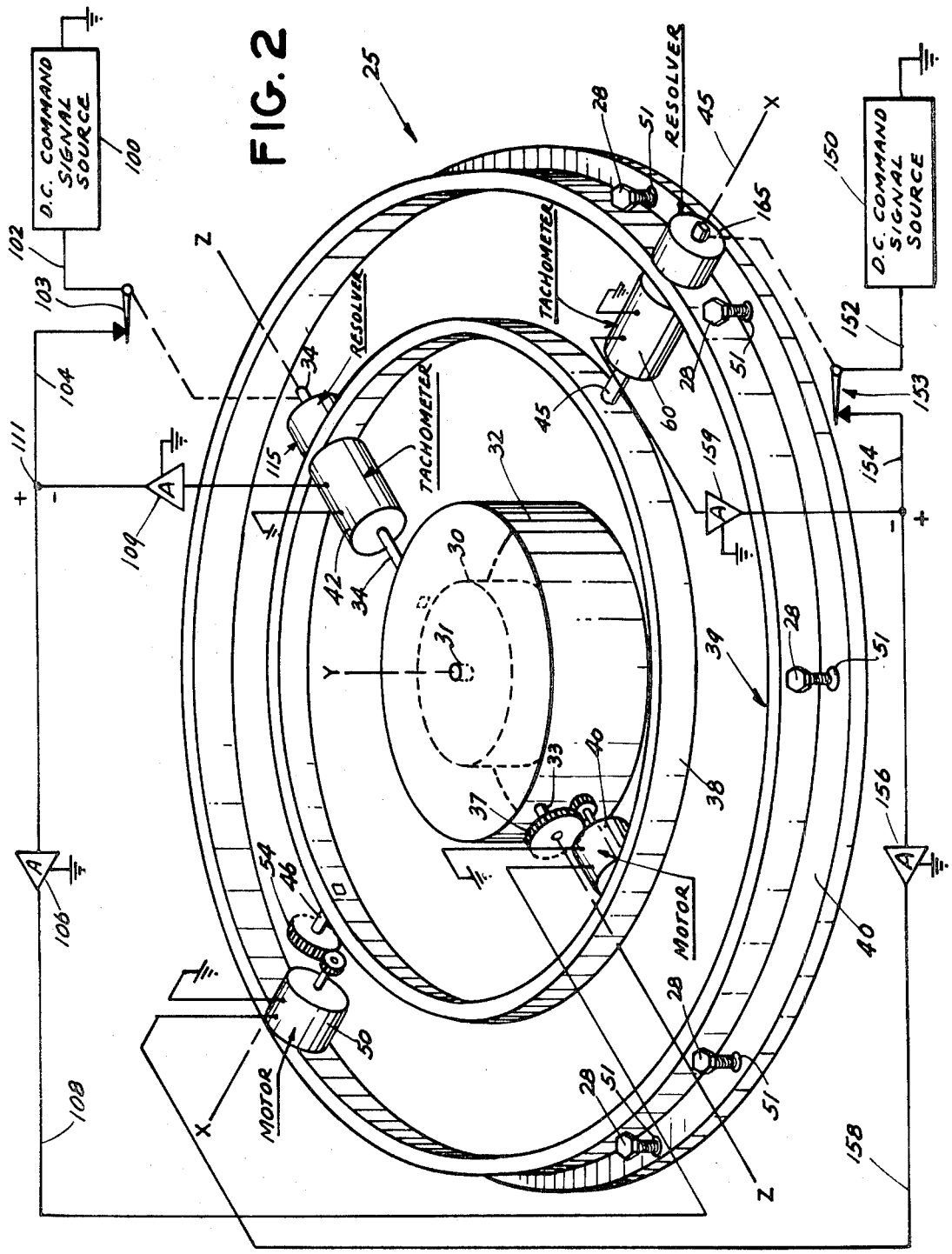

INVENTORS
WILLIAM PACKARD
HOWARD A. HERZOG
BY Herbert L. Davis
ATTORNEY

United States Patent Office 3,550,395
Patented Dec. 29, 1970

3,550,395
FLEXURAL SUPPORT STRUCTURE
Howard Allan Herzog, Binghamton, N.Y., and William Packard, Fairlawn, N.J., assignors to The Bendix Corporation, a corporation of Delaware
Original application May 18, 1967, Ser. No. 639,476, now Patent No. 3,481,192, dated Dec. 2, 1969. Divided and this application Jan. 17, 1969, Ser. No. 792,176
Int. Cl. F16c *11/12;* F16d *3/16;* G01c *19/16*
U.S. Cl. 64—15                                              12 Claims

ABSTRACT OF THE DISCLOSURE

A flexural support structure of a test fixture for measuring the torque caused by any torque producing device about three orthogonal axes, simultaneously, utilizing torsional flex pivots and flexural support rod members between a stationary support and the torque producing device.

STATEMENT

The invention described herein was made in the performance of work under a NASA contract and is subject to the provisions of Section 305 of the National Aeronautics and Space Act of 1958, Public Law 85–568 (75 Stat. 435; 42 USC. 2457).

CROSS-REFERENCE TO RELATED APPLICATION

The present application is a division of a copending U.S. application Ser. No. 639,476 filed May 18, 1967 by Howard Allan Herzog and William Packard, now U.S. Pat. No. 3,481,192, granted Dec. 2, 1969 for a three axis torque measuring fixture and assigned to The Bendix Corporation, assignee of the present invention. The present invention is directed to a flexural support structure as described and claimed herein with reference to FIGS. 1 and 6.

BACKGROUND OF THE INVENTION

Field of the invention

This invention relates to the field of flexural support structures and more particularly to a flexural support structure in a test fixture for indicating the output torque of any torque producing device about three orthogonal axes, simultaneously. The torque, for example, may be caused by a change in magnitude or direction of the angular momentum of an element mounted for rotation, in response to an electrical command signal applied thereto.

Prior art of the invention

Momentum exchange stabilization control systems or space vehicles operate on the principle of momentum transfer between the vehicle and momentum storage devices such as reaction wheels or control moment gyroscopes. When the total angular momentum of the system is constant, vehicle rates are constant. Vehicle attitude control is maintained by controlling the momentum of the system with the storage devices which counteract disturbance torques and produce control torques on command. Reaction wheels generate control torques by varying wheel speed while control moment gyroscopes have gimbaled constant speed wheels wherein the control torques are generated by commanding gimbal rates. To ensure proper momentum transfer from the storage device to the vehicle for effecting a resultant torque thereon so as to change the attitude of the vehicle or oppose disturbance torques, requires prior measurement and verification of the resultant torque outputs as a function of the signal applied to the control storage device.

Prior utilization of torque load cell techniques for measurement over a large output range is impractical for than two axis measurement because of cross coupling, mechanical load centering and hysteresis.

The present invention overcomes these disadvantages by providing a calibrated torque measuring fixture wherein a torque producing device is mounted and supported basically by a flexural support structure including four cylindrical flexural support rods which oppose the torque or couple generated by the torque producing device. The flexural rods are mounted rigidly to an outer frame ring at one end and at the other end to an inner support ring through torsional flex pivots which allow a small angular rotation of the inner support ring about the axes along which the flexural support rods are located. A torque about any of three orthogonal axes is transferred to the inner support ring which mounts the torque producing device, thereby causing a small angular rotation of the inner ring with respect to the outer frame ring and thereby flexing the support rods.

Semiconductor strain gauges, as described and claimed in the aforenoted U.S. Pat. No. 3,481,192, are mounted on each support rod and connected in a Wheatstone bridge arrangement wherein an accurate signal output is detected on the Wheatstone bridge for even a slight flexure of the rods.

The invention provides for accurate and continuous measurement of torques about three orthogonal axes simultaneously, with high linearity and virtually infinite resolution, over a torque output range of better than 2,000 to 1; that is, from a range of, for example, 0.08 foot pound to 160 foot pounds. Further, the range may be varied by substitution of flexural support rods of different cross sectional area or stiffness.

SUMMARY OF THE INVENTION

This invention relates to a flexural support structure which may be applied in a three axis torque measuring fixture having a momentum storage device or other torque producing device mounted thereto which causes a torque to be applied to the fixture, and the measuring fixture including a means for accurately sensing the applied torque about three orthogonal axes, simultaneously.

A further object of this invention is to eliminate twist restraint of the flexural support rods by providing torsional flex pivots about orthogonal axes with the flexural support rods and to prohibit twist shear of the flexural support rods.

A further object of this invention is to provide flexural support structure applicable to a test fixture, the support structure including an inner support ring and an outer frame ring and flexural support rods therebetween and cooperatively arranged in the test fixture having strain gauges responsive to a flexure of the support rods caused by a torque applied to the inner support ring so as to produce a signal corresponding to the torque.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

FIG. 1 is a top plan view of the flexural support structure of the present invention applied to a three axis torque measuring fixture.

FIG. 2 is a diagrammatic view of a torque producing device such as a control movement gyroscope responsive to an electrical command input signal to provide torque to be measured and which may be mounted in the flexural support structure of the torque measuring fixture of FIG. 1 with the X-axis and the Z-axis of the device of FIG. 2 in alignment with the corresponding X and Z axes of the flexural support structure of FIG. 1.

FIG. 3 is an enlarged sectional view of a flexural support rod taken along the line 3—3 of FIG. 1 and looking in the direction of the arrows and showing semiconductor strain gauges of the torque measuring fixture mounted thereon.

FIG. 4 is an enlarged sectional view of another flexural support rod taken along the line 4—4 of FIG. 1 and looking in the direction of the arrows and showing semiconductor strain gauges of the torque measuring fixture mounted thereon.

FIG. 5 is a perspective view of the flexural support rod of FIG. 3 with the semiconductor strain gauges of the torque measuring fixture mounted thereon.

Figure 6:
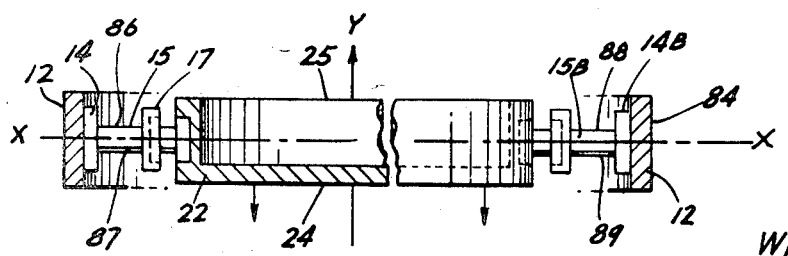

FIG. 6 is a diagrammatic X-axis representation of the invention to illustrate the points of tension and compression on the flexural support rods due to the weight of a load including the torque producing device.

Figure 7:
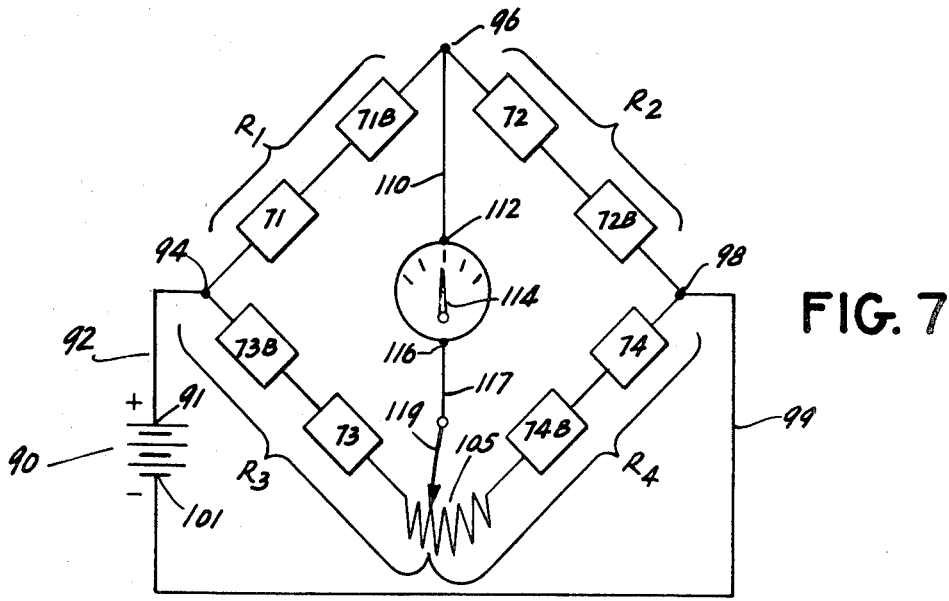

FIG. 7 is a Wheatstone bridge having semiconductor strain gauges electrically connected in arms thereof to produce a signal corresponding to the torque applied to the inner support ring of the torque measuring fixture about either the X-axis or the Z-axis thereof.

Figure 8:
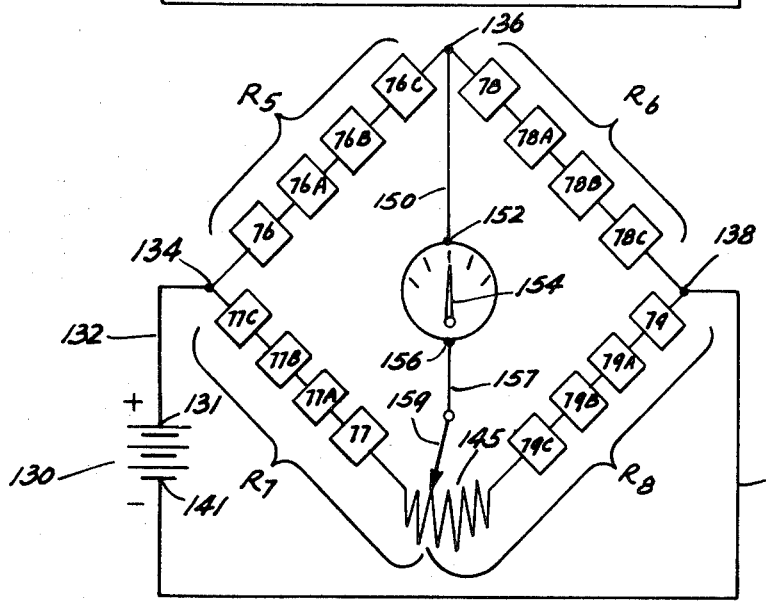

FIG. 8 is a Wheatstone bridge having semiconductor strain gauges electrically connected in arms thereof to produce a signal corresponding to the torque applied to an inner support ring of the torque measuring fixture about the Y-axis thereof.

DESCRIPTION OF THE INVENTION

Referring to FIG. 1, wherein different parts of similar structure are indicated by like numerals bearing different suffixes, a flexural support structure 10 consists basically of a stationary outer ring member 12, flexural support rods 15, 15A, 15B and 15C, and an inner support ring member 22. The flexural support rods 15, 15A, 15B and 15C are rigidly mounted to the outer ring member 12 through the respective flanges 14, 14A, 14B and 14C and are thereby coupled, respectively, through pivot collars 17, 17A, 17B and 17C and flexural pivots 20, 20A, 20B and 20C to the inner support ring member 22.

The flexural pivots 20, 20A, 20B and 20C are mounted, respectively, to pivot collars 17, 17A, 17B and 17C and thereby couple the respective support rods 15, 15A, 15B and 15C to the inner support ring member 22. The respective flexural pivots 20, 20A, 20B and 20C may be of a type shown and described with reference to FIGS. 4 and 5 of U.S. Pat. No. 3,132,315 granted May 5, 1964, to F. Henry S. Rossire, and described and claimed in a U.S. Pat. No. 3,073,584 granted Jan. 15, 1963 to Henry Troeger, both of which patents have been assigned to the Bendix Corporation, assignee of the present invention.

The flexural pivots 20 and 20B are positioned along the X-axis of FIG. 1 and so arranged as to permit small angular movement about the X-axis of the inner ring 22 with respect to the stationary outer ring 12 with relatively little resistance as compared to the bending moments of the flexural support rods 15A and 15C which resist such angular movement about the X-axis. Similarly, the flexural pivots 20A and 20C located along the Z-axis allow small angular rotation about the Z-axis of the inner ring 22 with respect to the outer ring 12 with little torque restraint as compared with the bending moments of the flexural support rods 15 and 15B which resist such motion.

The inner ring 22 is L-shaped in cross section having a base portion 24 to which a torque producing device 25, shown by FIG. 2, may be attached by bolts 28. Moreover, as shown by FIG. 1, tension of the flexural support rods 15, 15A, 15B and 15C occurs at sides 27, 27A, 27B and 27C, respectively, upon a torque being applied to the inner ring 22 in a counterclockwise direction or about the plus Y-axis, as defined by the conventional right hand rule, while a compression occurs at the opposite sides 29, 29A, 29B and 29C, respectively, of the rods 15, 15A, 15B and 15C.

Upon a torque being applied to the inner ring 22 in an opposite clockwise direction or about the minus Y-axis, the tension and compression effects on the sides of the support rods 15, 15A, 15B and 15C are reversed.

Referring to FIG. 2, there is shown a typical torque producing device 25 which may be applied within the contemplation of this invention to the flexural structural support of the present invention. Such a typical torque producing device may be of a control moment gyroscope type including basically a rotor 30 having a spin axis Y and rotatably mounted on a shaft 31 in an inner gimbal 32. The inner gimbal 32 is in turn pivotally mounted in an outer gimbal 38 about an axis Z while the gimbal 38 is pivotally mounted in a frame 39 about an axis X. The frame 39 is L-shaped in cross section having a base portion 40 which may be secured to the base portion 24 of the inner ring 22 of the support 10 by the bolts 28, shown in FIG. 2. In the torque producing device or gyroscope 25, the rotor 30, having angular freedom about the Y-axis, is rotatably mounted in the inner gimbal 32 which is coupled along the Z-axis by oppositely disposed shafts 33 and 34 rotatably mounted in suitable bearings carried by the outer gimbal 38.

A permanent magnet type D.C. motor 40 is mounted on the outer gimbal 38 along the Z-axis to drive a gear 37, the shaft 33 and the inner gimbal 32 about the Z-axis upon an electrical command signal being applied to control the motor 40.

The electrical command signal to the motor 40 may be supplied by a suitable direct current command signal source 100 through output line 102, gimbal limit switch 103, and conductor 104 to input terminals of a D.C. amplifier 106 of conventional type. Output conductors 108 may lead from output terminals of the amplifier 106 to the D.C. torquer motor 40 to control the sense and magnitude of the torque applied by the motor 40 to the shaft 33.

The outer gimbal 38 rigidly mounts a D.C. tachometer generator 42 which is driven by the support shaft 34. The shaft 34 is driven through gimbal 32, shaft 33, and gear 37 by the motor 40 and the tachometer generator 42 is responsive to the driven speed of the motor 40 so as to produce a direct current signal which may be fed back through D.C. amplifier 109 to the conductor 104 at a solid connection summing point 111 to wipe out the direct current command signal applied to the motor 40.

A resolver 115 of a conventional type is carried by the outer gimbal 38 and has a rotor operatively connected to the shaft 34 so as to be responsive to the angular position of the shaft 34 to produce an electrical output of an amplitude corresponding to the sine and cosine of the angular position of the inner gimbal 32 relative to the outer gimbal 38. Further, the angular position of the gimbal 32 and shaft 34 about the Z-axis may mechanically actuate a gimbal limit switch 103 which is driven to an open position at a predetermined displacement position of gimbal 32 relative to gimbal 38 so as to prohibit subsequent signals from being applied to the motor 40 after gimbal 32 has reached the predetermined displacement.

The outer gimbal 38 is pivotally mounted relative to the gimbal 39 along the X-axis by means of shafts 45 and 46 with the shaft 45 being rotatably mounted in suitable bearings carried by the frame 39.

A D.C. motor 50 is mounted on the frame 39 along the X-axis and is responsive to the electrical command signal to drive a gear 54, shaft 46 and outer gimbal 38 about the X-axis when desired.

The electrical command signal to the motor 50 may be supplied by a suitable direct current command signal source 150 through an output conductor 152, gimbal limit switch 153, conductor 154 to the input terminals of a D.C. amplifier 156 of conventional type. Output conductor 158 may lead from output terminals of the amplifier 156 to the D.C. torquer motor 50 which may be of a conventional permanent magnet type.

The frame 39 rigidly mounts a D.C. tachometer generator 60 which is driven by the support shaft 45 and is responsive to rotation of the shaft 45 driven through gimbal 38, shaft 46, and gear 54 by the motor 50 so as to produce a direct current signal responsive to the speed of rotation of the motor 50 which may be fed back through D.C. amplifier 159 to conductor 154 and motor 50 tending to wipe out the command signal applied to the D.C. motor 50.

Further, in order to determine the displacement of the outer gimbal 38 at any time relative to the frame 39, there is provided a resolver 165 of conventional type carried by the frame 39 and having a rotor operatively connected to the shaft 34 so as to be responsive to the angular position of the shaft 45 to produce an electrical output of an amplitude corresponding to the sine and cosine of the angular position of the outer gimbal 38 relative to the frame 39. Further, the angular position of the outer gimbal 38 relative to the frame 39 and the angular position of the shaft 45 about the X-axis may mechanically actuate a gimbal limit switch 153 which is driven to an open position at a predetermined angular displacement of gimbal 38 relative to frame 39 so as to prohibit subsequent command signals from being applied to the motor 50 after the gimbal 38 has reached the predetermined displacement.

Bolts 28, as shown by FIG. 2, may be inserted through holes 51 in the frame 39 which mate with corresponding holes 52 in the base 24 of inner ring member 22, as shown by FIG. 1, so as to rigidly secure the torque producing device 25 to the inner ring member 22 in such a manner that the axes X and Z of the torque producing device 25 coincide with the corresponding axes X and Z of the test fixture 10.

On a space vehicle the inner ring member 22 may be considered to be a platform mounted to the vehicle so that upon a command signal being applied to the control winding of the motor 40 or 50 the torque produced about the control moment gyroscope axes X or Z as the case may be is applied directly to the platform 22 to change the attitude of the vehicle or counteract disturbance torques. It is thus important to know the torque that will be applied to the platform or vehicle for a given command signal applied to the control windings of the gimbal motors 40 and 50 of the control moment gyroscope 25 or other torque producing device.

Referring to FIG. 3, an enlarged sectional view taken along the lines 3—3 of FIG. 1 and looking in the direction of the arrows is provided showing the flexural support rod 15 intermediate the stationary outer ring 12 and the inner support ring 22 of the three axis torque fixture 10. The support rod 15 is provided with piezo resistive type semiconductor strain gauges which change electrical resistivity upon a stress being applied thereto. Strain gauges 71 and 74, as shown by FIG. 3, are attached above a Z-axis of the rod 15 to the surface 80 of the flexural support rod 15 in equal spaced relation at opposite sides of a Y-axis of the rod 15 while strain gauges 73 and 72 are attached below the Z-axis of the rod 15 to the surface 80 of the flexural support rod 15 in equal spaced relation at opposite sides of the Y-axis of the rod 15 so as to be stressed upon a flexure of the support rod 15 caused by a torque being applied to the inner support ring 22 about the Z-axis of the ring 22, as shown by FIG. 1.

Also, strain gauges 76 and 79 are mounted on the flexural support rod 15 to the right of the Y-axis of the rod 15, as shown by FIG. 3, and in equal spaced relation at opposite sides of the Z-axis of the rod 15 while strain gauges 77 and 78 are mounted on the support rod to the left of the Y-axis of the rod 15 and in equal spaced relation at opposite sides of the Z-axis of the rod 15 so as to be stressed upon flexure of the support rod 15 caused by a torque being applied to the inner support ring 22 about the Y-axis of the ring 22, as shown by FIG. 1.

Referring to FIG. 4, which is an enlarged sectional view taken along the lines 4—4 of FIG. 1 and looking in the direction of the arrows, the flexural support rod 15B located in diametrical opposition along the X-axis to the flexural support rod 15 is shown having semiconductor strain gauges 71B and 74B attached to the flexural support rod 15B below the Z-axis of the rod 15B in equal spaced relation at opposite sides of the Y-axis of the rod 15B and strain gauges 72B and 73B attached above the Z-axis of the rod 15B and in equal spaced relation at opposite sides of the Y-axis. Also, strain gauges 76B and 79B are attached to the flexural support rod 15B to the right of the Y-axis and in equal spaced relation below and above, respectively, the Z-axis of the rod 15B, as shown in FIG. 4, and strain gauges 77B and 78B are mounted on the support rod to the left of the Y-axis of the rod 15B and in equal spaced relation below and above, respectively, the Z-axis of the rod 15B, as shown by FIG. 4.

For a given torque applied about the Z-axis to the inner support ring 22, as shown by FIG. 1, strain gauges 71 and 74 on flexural support rod 15, of FIG. 3, and 71B, 74B on flexural support rod 15B, of FIG. 4, will simultaneously be under a tensile or compressive stress depending upon the direction of the applied torque. That is, for a torque about the Z-axis of the inner ring 22, as shown by FIG. 1, in a counterclockwise direction or in a plus Z-axis sense as defined by the conventional right hand rule, strain gauges 71 and 74 on the top of flexural support rod 15, as shown by FIG. 3, and strain gauges 71B and 74B on the bottom of flexural support rod 15B, as shown by FIG. 4, are under tension while strain gauges 72 and 73 on the bottom of flexural support rod 15, as shown by FIG. 3, and strain gauges 72B and 73B on the top of flexural support rod 15B, as shown by FIG. 4, are under compression.

The above mentioned strain gauges, responsive to torque about the Z-axis of the inner ring 22, as shown by FIG. 1, are connected in a Wheatstone bridge configuration of FIG. 7, to be hereinafter more fully described.

Referring again to FIG. 3, strain gauges 76 and 79 attached to support rod 15, upon a torque applied to inner ring 22 of FIG. 1 about the plus Y-axis, as shown by FIG. 1, will be under tension while the strain gauges 77 and 78 will be under compression. Similarly, strain gauges 76B and 79B on flexural support rod 15B, as shown by FIG. 4, and located in diametrical opposition along the X-axis from flexural support rod 15, of the ring 22 of FIG. 1, will be under tension for torque about the plus Y-axis of the ring 22 of FIG. 1, and strain gauges 77B and 78B will be under compression. These strain gauges 76, 76B; 77, 77B; 78, 78B; and 79, 79B are connected in a second Wheatstone bridge described with reference to FIG. 8 to detect flexure of support rods 15 and 15B corresponding to a torque applied to the inner support ring 22 about the Y-axis, as shown by FIG. 1.

The Wheatstone bridge of FIG. 8 also includes the strain gauges 76A, 76C; 77A, 77C; 78A, 78C; and 79A, 79C which are mounted along the Z-axis on flexural support rods 15A and 15C in the manner as illustrated in FIGS. 3 and 4 in describing the flexural support rods 15, 15B and gauges 76 through 79 and 76B through 79B. In particular, upon a torque being applied to inner ring 22 about the plus Y-axis, as shown by FIG. 1, all strain gauges 76 on flexural support rods 15–15C are under tension as are all strain gauges 79. Simultaneously, all strain gauges 77 on flexural support rods 15–15C are under compression as are all strain gauges 78.

In order to detect flexure of the support rods 15A and 15C caused by a torque applied to the inner ring 22 about the X-axis, as shown by FIG. 1, strain gauges are mounted on support rods 15A and 15C in a similar arrangement as that described with reference to strain gauges 71, 72, 73, 74 and 71B, 72B, 73B and 74B mounted on flexural support rods 15 and 15B, respectively, and responsive to a torque applied about the Z-axis. That is, support rods 15A and 15C have strain gauges (not shown) mounted on the tops and bottoms thereof, all of which are connected in a third Wheatstone bridge (not shown) so as to detect flexure of the support rods 15A and 15C and provide a corresponding signal indicative of the torque applied to the inner support ring 22 about the X-axis of FIG. 1. It will be noted, for example, that for the torque applied to inner ring 22 about the plus X-axis of FIG. 1, the strain gauges on the bottom of flexural support rod 15A and the top of flexural support rod 15C would be under tension while those on the top of flexural support rod 15A and bottom of flexural support rod 15C would be under compression.

Referring to FIG. 5, a perspective view of flexural support rod 15 is shown having strain gauges 71 through 74 and 76 through 79 mounted on the external surface 80 thereof. The semiconductor strain gauges are mounted on the flexural support rod 15 by any suitable method such as by the application of a thin layer of epoxy adhesive or bonding therebetween. The support rod 15 of FIG. 5 is also illustrative of the support rods 15A, 15B and 15C, all of which may be made of stainless steel. The material of the flexural support, the cross sectional area and the length thereof determine the flexure of the flexural support rods for a given bending moment or torque applied thereto.

As indicated in the description of FIG. 1, the flexural support rods 15 may be under tension at the sides 27, 27A, 27B and 27C, as shown by FIG. 1, due to a torque being caused by the torque producing device 25 about the plus Y-axis of the ring 22. Thus, the semiconductor strain gauges 76, 79; 76A, 79A; 76B, 79B; and 76C, 79C on the flexural support rods 15 through 15C, respectively, will simultaneously be under tension which increases the electrical resistivity thereof. The torque about the plus Y-axis, of the ring 22 of FIG. 1, causes compression on the support rods 15 through 15C at the sides 29, 29A, 29B and 29C of the respective support rods. Thus, strain gauges 77, 78; 77A, 78A; 77B, 78B; and 77C, 78C on flexural support rods 15 through 15C, respectively, will simultaneously be under compression with a resultant decrease in the electrical resistivity thereof.

Referring now to FIG. 6, a diagrammatic representation of a sectional view of the invention taken along the X-axis and illustrating the points of tension and compression on the flexural support rods 15 and 15B due to the weight of the system. For clarity, the torque producing device 25 has been enclosed and boxed and is directly supported by base 24 of the inner ring 22. Under static conditions, wherein no electrical signals are applied to the torque producing device 25, only the weight of the load comprising torque producing device 25 and inner ring 22 cause flexure of the support rods 15 and 15B. Thus, the support rod 15 is under tension at upper side 86 and under compression at lower side 87 of the support rod 15 and flexural support rod 15B is under tension at upper side 88 and under compression at lower side 89 of the support rod 15B.

Further, with reference to FIG. 3, strain gauges 71 and 74, mounted on the upper side of the flexural support rod 15 are under tension while strain gauges 72 and 73 on the lower side of the support rod 15 are under compression from the flexure of the support rod 15 caused by the load. Also, with reference to FIG. 4, the strain gauges 72B and 73B on the upper side of the support rod 15B, due to the weight of the load supported by flexural support rod 15B, are under tension while strain gauges 71B and 74B on the lower side of the support rod 15B are under compression.

The load, of course, is similarly supported also by flexural support rods 15A and 15C located along the Z-axis and it will be obvious that the strain gauges on the upper halves of the flexural support rods 15A and 15C are under tension while the strain gauges on the lower halves of the flexural support rods 15A and 15C are under compression.

Referring to FIG. 7, the Wheatstone bridge used to measure the torque applied by the torque producing device 25 to the inner support ring 22 about the Z-axis includes four arms of electrical resistance $R_1$, $R_2$, $R_3$ and $R_4$, respectively. A voltage source 90 having a positive terminal 91 is connected by a conductor 92 to a junction 94 of the bridge intermediate the arms of resistances $R_1$ and $R_3$. From junction 94 strain gauges 71 and 71B comprising the arm of resistance $R_1$ are connected in series to a junction 96. Strain gauges 72 and 72B comprising the arm of resistance $R_2$ are connected in series with the arm of resistance $R_1$ from the junction 96 to a junction 98 which is connected by a conductor 99 to a negative terminal 101 of the voltage source 90. Strain gauges 74 and 74B of the flexural support rods 15 and 15B, respectively, are connected in series in the arm of resistance $R_4$ at one end from junction 98 and at an opposite end to a linear potentiometer 105 leading to series connected strain gauges 73 and 73B of the arm of resistance $R_3$ connected to the junction 94. A conductor 110 from junction 96 intermediate arms of resistance $R_1$ and $R_2$ leads to a terminal 112 of a voltage indicator or voltmeter 114 having an opposite terminal 116 connected by conductor 117 to wiper arm 119 of the potentiometer 105.

The potentiometer 105 may be used to balance the bridge, of FIG. 7, when the strain gauges in the arms of resistance $R_1$ through $R_4$ have no stress applied thereto other than the tension applied due to the weight of the load comprising torque producing device 25 and the inner ring 22 supported by the support rods 15 and 15B. The wiper arm 119 is moved along the potentiometer 105 to vary the resistance in the arms of resistance $R_3$ and $R_4$ to compensate for strain gauge resistance differences and until a null signal appears at the voltage indicator 114 which indicates that the bridge is balanced, in which condition $R_1/R_2=R_3/R_4$.

The second Wheatstone bridge (not shown) used to measure the torque applied to inner ring 22 about the X-axis would consist of similar strain gauges in the arms thereof responsive to the flexure of flexural support rods 15A and 15C.

Referring to FIG. 8, the Wheatstone bridge used to measure the torque applied about the Y-axis includes four arms of electrical resistance $R_5$, $R_6$, $R_7$ and $R_8$, respectively. A voltage source 130 has a positive terminal 131 connected by a conductor 132 to a junction 134 between the arms of resistance $R_5$ and $R_7$. From terminal 134 strain gauges 76, 76A, 76B and 76C comprising the arm of resistance $R_5$ are connected in series to a junction 136. Strain gauges 78, 78A, 78B and 78C comprising the arm of resistance $R_6$ are connected in series with the arm of resistance $R_5$ from the junction 136 to a junction 138 connected by a conductor 139 to a negative terminal 141 of the voltage source 130. Strain gauges 79, 79A, 79B and and 79C of the flexural support rods 15 through 15C, respectively, are connected in series in the arm of resistance $R_8$ and at one end to the terminal 138 and at an opposite end to a linear potentiometer 145 leading to series connected strain gauges 77, 77A, 77B and 77C of the arm of resistance $R_7$ connected to the junction 134. A conductor 150 leads from terminal 136 between the arms of resistance $R_5$ and $R_6$ to a terminal 152 of a voltage indicator or voltmeter 154 having an opposite terminal 156 connected by a conductor 157 to wiper arm 159 of the potentiometer 145. The wiper arm 159 is moved along the potentiometer 145 to vary the resistance in the arms of resistance $R_7$ and $R_8$ until a null signal appears at the voltage indicator 154 which indicates that the bridge is balanced, in which condition $R_5/R_6=R_7/R_8$.

OPERATION

The present invention is directed to the flexural support structure 10 of FIGS. 1 and 6, as distinguished from the torque measuring test fixture. The operation of the flexural support structure 10 may be best understood in an operative relation in the test fixture by considering each axis separately. Consider first, that the torque producing element 25 creates a resultant torque about the plus Z-axis which is then transmitted to the inner support ring 22. This torque causes the support rods 15 and 15B along the X-axis to bend or deflect since the torsional flex pivots 20A and 20C along the Z-axis provide Z-axis rotational freedom over a small angular increment. A torque about the plus Z-axis causes the flexural support rod 15 to be deflected downward while the flexural support rod 15B will be deflected upward.

Referring to FIGS. 3 and 4, it is observed that the strain gauges 71 and 74 on flexural support rod 15 and strain gauges 71B and 74B on flexural support rod 15B will be subject to a tensile strain while results in an increase in strain gauge resistance while strain gauges 72 and 73 on flexural support rod 15 and strain gauges 72B and 73B on flexural support rod 15B will be subject to a compressive strain which results in a decrease in strain gauge resistance.

Referring to FIG. 7, the equation for balance of the Wheatstone bridge to measure the torque about the Z-axis is $R_1/R_2 = R_3/R_4$. The potentiometer 105 in the bridge arrangement may be initially adjusted to compensate for any manufacturing differences in the strain gauge resistances in the arms thereof. The torque about the plus Z-axis, of FIG. 1, causes the resistance of the arms of resistance $R_1$ and $R_4$ in the Wheatstone bridge of FIG. 7 to increase since the strain gauges 71, 71B and 74, 74B in the respective arms thereof are under tension while the resistance of the arms of resistance $R_2$ and $R_3$ decreases due to the strain gauges 72, 72B and 73, 73B in the respective arms thereof being under compression. The relationship for the bridge balance will no longer be satisfied and a bridge output voltage will appear at the voltage indicator 114 corresponding to the torque about the Z-axis, of FIG. 1, which may be a function of a command signal applied to the torque producing element 25.

Similarly, a resultant torque on the inner support ring 22 about the plus X-axis, of FIG. 1, will cause flexure of the flexural support rods 15A and 15C located along the Z-axis, of FIG. 1, since the torsional flex pivots 20 and 20B along the X-axis, of FIG. 1, allow rotational freedom of inner ring 22 about the X-axis, as shown by FIG. 1, over a small angular increment. Thus, the strain gauges mounted on the tops and bottoms of the flexural supports rod 15A and 15C may be electrically connected in another Wheatstone bridge (not shown) but which is similar to the bridge of FIG. 7 which indicates a torque applied to inner ring 22 about the Z-axis, as shown by FIG. 1.

Finally, a resultant torque about the plus Y-axis, of FIG. 1, transmitted to the inner support ring 22 causes tension of all four support rods 15, 15A, 15B and 15C at sides 27, 27A, 27B and 27C, respectively, and compression at sides 29, 29A, 29B and 29C. The strain gauges 76, 76A, 76B and 76C and 79, 79A, 79B and 79C on the tensile sides 27, 27A, 27B and 27C of flexural support rods 15, 15A, 15B and 15C, respectively, increase in electrical resistivity, causing the effective resistance in the arms of resistance $R_5$ and $R_8$ of FIG. 8 while to increase while the strain gauges 78, 78A, 78B and 78C and 77, 77A, 77B and 77C on the compressive sides 29, 29A, 29B and 29C of the flexural support rods 15 through 15C, respectively, are in compression, thereby decreasing the resistance of the arms of resistance $R_6$ and $R_7$. The relationship $R_5/R_6 = R_7/R_8$ is no longer satisfied and a signal output is thus detected by voltage indicator 154, corresponding to the torque applied to inner ring 22 about the plus Y-axis, of FIG. 1.

Referring in particular to FIGS. 3, 4 and 8, it will be seen that for a torque transmitted to inner support ring 22 about the plus Z-axis strain gauges 76, 77 and 76B, 77B on flexural support rods 15 and 15B, respectively, are also under tensile strain, thereby increasing the resistances thereof, although the strain is considerably less than that on strain gauges 71, 74 and 71B, 74B. Further, strain gauges 78, 79 and 78B, 79B on rods 15 and 15B, respectively, are under compression, and will therefore decrease in resistance.

With reference to FIG. 8 in particular, the resistance of the bridge arms of resistance $R_5$ and $R_7$ having strain gauges 76, 76B and 77, 77B, respectively therein, increases, while the resistance in the bridge arms of resistance $R_6$ and $R_8$ having strain gauges 78, 78B and 79, 79B, respectively therein, decreases, Since the resistance of the arm of resistance $R_5$ will increase by the same amount as the resistance of the arm of resistance $R_7$ and the resistance of the arm of resistance $R_6$ will decrease by the same amount as the resistance of the arm of resistance $R_8$, the relationship $R_5/R_6 = R_7/R_8$ remains satisfied and the Y-bridge remains balanced although a torque is applied to inner ring 22 about the Z-axis of FIG. 1. Upon a torque being applied to the inner support ring 22 about the negative Z-axis of FIG. 1, the strain in strain gauges 76, 77, 78 and 79 and 76B, 77B, 78B and 79B is simply reversed and the Y-axis bridge still remains balanced. Similarly, the Y-axis bridge of FIG. 8 will also remain balanced for a torque about the X-axis.

Referring to FIGS. 3, 4 and 7 upon a torque being applied about the positive Y-axis of FIG. 1, strain gauges 72, 74 and 72B, 74B on flexural support rods 15 and 15B, respectively, will experience a small tensile stress, while strain gauges 71, 73 and 71B, 73B on flexural support rods 15 and 15B, respectively, will experience a corresponding compressive stress. Thus, the resistance of the arm of resistance $R_1$ having strain gauges 71 and 71B therein decreases with a corresponding decrease in the arm of resistance $R_3$ (having strain gauges 73 and 73B therein). Also, strain gauges 72 and 72B on the tensile side of the flexural support rods 15 and 15B, respectively, being electrically connected in the arm of resistance $R_2$, will increase the resistance of the arm of resistance $R_2$ while strain gauges 74 and 74B on flexural support rods 15 and 15B, respectively, being electrically connected in the arm of resistance $R_4$, will increase the electrical resistance thereof. Thus, the resistance of the arm of resistance $R_1$ decreases a corresponding amount as that of the decrease in resistance of the arm of resistance $R_3$ and the arm of resistance $R_2$ increases a corresponding amount as does the arm of resistance $R_4$. The relationship $R_1/R_2 = R_3/R_4$ remains satisfied and the Z-axis Wheatstone bridge of FIG. 7 is not unbalanced by a torque applied to inner support ring 22 about the positive Y-axis of FIG. 1.

For a torque about the negative Y-axis of FIG. 1, the strain in strain gauges 71, 72, 73 and 74 and 71B, 72B, 73B and 74B is simply reversed and the Z-axis bridge still remains balanced. Similarly, the X-axis bridge (not shown) will also remain balanced for a torque about the Y-axis.

Referring in particular to FIGS. 3, 4 and 6, with the test fixture in a horizontal orientation, the load including torque producing device 25 may be considered to be symmetrical although any unbalances can initially be nulled out in the Wheatstone bridges. Strain gauges 71, 74 and 72B, 73B on the sides 86 and 88 of the flexural support rods 15 and 15B, respectively, of FIG. 6, are under tension and increase in electrical resistance due to the weight of the load comprising torque producing device 25 and inner ring 22.

Further, strain gauges 72, 73 and 71B, 74B on the sides 87 and 89 of the flexural support rods 15 and 15B, respectively, being under compression, as shown by FIG. 6, due to weight of torque producing device 25 and inner ring 22 will decrease in electrical resistance. Nevertheless, the weight of the load supported by the flexural support rods 15 and 15B, to which these strain gauges are mounted and connected in the Wheatstone bridge of FIG. 7, will not cause an unbalance of the bridge. The resistance of the arm of resistance $R_1$ effectively remains the same since the increase in resistance of strain gauge 71 on side 86 of flexural support rod 15 is offset by a corresponding decrease in resistance of strain gauge 71B mounted on the compressive side 89 of flexural support rod 15B. Similarly, in the arm of resistance $R_4$ the increase in resistance of strain gauge 74 is offset by the corresponding decrease in resistance of strain gauge 74B.

In the arm of resistance $R_2$ the decrease in resistance of strain gauge 72 being on the compressive side 87 of the flexural support rod 15 is offset by a corresponding increase in resistance of strain gauge 72B on the tensile side 88 of flexural support rod 15B. Similarly, in the arm of resistance $R_3$ the decrease in resistance of strain gauge 73 is offset by a corresponding increase in resistance of strain gauge 73B. Thus, it is seen that the Z-axis Wheatstone bridge of FIG. 7 remains balanced although the weight of the load is supported by the flexural support rods 15 and 15B to which the Z-axis bridge strain gauges are attached.

Similarly, the X-axis Wheatstone bridge (not shown) also remains balanced although the weight of the torque producing device 25 and inner ring 22 is supported by the flexural support rods 15A and 15C to which the X-axis bridge strain gauges are attached.

With reference to FIGS. 3, 4 and 8, strain gauges 76, 77 and 78B, 79B on the sides 86 and 88 will be in tension and will effect a small increase in resistance due to the weight of the torque producing device 25 and inner ring 22 while strain gauges 78, 79 and 76B, 77B on the sides 87 and 89 will be in compression and will effect a corresponding decrease in resistance from the unstrained position.

Also, strain gauges 76A, 77A and 78C, 79C, on the support rods 15A and 15C will be in tension and will effect a small increase in resistance due to the weight of the torque producing device 25 and inner ring 22 while strain gauges 78A, 79A and 76C, 77C on the X-axis support rods, will be in compression and will effect a corresponding decrease in resistance from unstrained position. The effective change in resistance of each arm of resistance in the Y-axis bridge is therefore zero and the Y-axis bridge remains balanced under the weight of the load. Further, it should be obvious that the X, Y and Z-axes Wheatstone bridges will remain balanced under the weight of load for any orientation of the torque measuring fixture.

While the flexural support structure of FIGS. 1 and 6 forms the subject matter of the present invention, the three axis torque measuring fixture is described and claimed in the U.S. Pat. No. 3,481,192 with reference to FIGS. 1 through 8.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:
1. A flexural support structure for a torque producing device comprising:
   a movable member for supporting the torque producing device;
   another member for supporting the movable member;
   a first pair of flexural support rods,
   each of said first pair of flexural support rods being connected at one end to said movable member and at an opposite end to said other member,
   each of said first pair of flexural support rods being positioned in a diametrically opposite relation to the movable member and intermediate the other member and the movable member for supporting the torque producing device,
   said first pair of flexural support rods extending along a first axis; and
   each of said first pair of rods including a torsional flex pivot,
   a second pair of flexural support rods,
   each of said second pair of flexural support rods being connected at one end to said movable member and at an opposite end to said other member,
   each of said second pair of flexural support rods being positioned in a diametrically opposite relation to the movable member and intermediate the other member and the movable member for supporting the torque producing device,
   said second pair of flexural support rods extending along a second axis perpendicular to the first axis;
   each of said second pair of flexural support rods including a torsional flex pivot,
   the torque producing device being effective to cause a torque on the movable member;
   the torsional flex pivots of the first pair of rods being effective to permit an angular adjustment of the position of the movable member with respect to the other member about the first axis;
   the torsional flex pivots of the second pair of rods being effective to permit an angular adjustment of the position of the movable member with respect to the other member about the second axis;
   the first pair of flexural support rods being effective to flex upon an adjustment of the position of the movable member with respect to the member about any axis orthogonal to the first axis; and
   the second pair of flexural support rods being effective to flex upon an adjustment of the position of the movable member with respect to the other member about any axis orthogonal to the second axis.

2. The flexural support structure defined by claim 1 in which the movable member includes:
   an inner support ring member for pivotally mounting the torque producing device; and
   the other member includes:
   an outer ring member;
   the inner ring member being connected to the first pair of flexural support rods and pivotally supported by the torsional flex pivots of the first pair of flexural support rods along the first axis and the inner ring member being further connected to the second pair of flexural support rods and pivotally supported by the torsional flex pivots of the second pair of flexural support rods along the second axis;
   the outer ring member being connected to the first pair of flexural support rods which extend along the first axis of the first pair of torsional flex pivots and to the second pair of flexural support rods which extend along the second axis of the second pair of torsional flex pivots.

3. For use in an apparatus to measure torque caused by a torque producing device;
   the flexural support structure defined by claim 1 in which the movable member includes:
   an inner support ring member for pivotally mounting the torque producing device; and
   the other member includes:
   an outer stationary test fixture ring member;
   the inner ring member being connected to the first pair of flexural support rods and pivotally supported by the torsional flex pivots of the first pair of flexural support rods along the first axis and the inner ring member being further connected to the second pair of flexural support rods and pivotally supported by the torsional flex pivots of the second pair of flexural support rods along the second axis;

the outer ring member being fixedly attached to the first pair of flexural support rods which extend along the first axis to the first pair of torsional flex pivots and to the second pair of flexural support rods which extend along the second axis to the second pair of torsional flex pivots.

4. For use in an apparatus to measure a torque applied about one or more orthogonal axes simultaneously and including a torque producing device responsive to an electrical command signal to effect said torque, a flexural support structure comprising:

a stationary outer ring member, an inner support ring member for mounting the torque producing device;

a first pair of torsional flex pivots attached to the inner support ring member at diametrically opposite points thereof and along a first axis;

a second pair of torsional flex pivots attached to the inner support ring member at diametrically opposite points thereof and along a second axis perpendicular to the first axis;

a first pair of flexural support rods, each of said first pair of rods having one end fixedly attached to an associated torsional flex pivot of said first pair of flex pivots, and each of said first pair of rods having an opposite end fixedly attached to diametrically opposite points on said stationary outer ring member and along said first axis, a second pair of flexural support rods, each of said second pair of rods having one end fixedly attached to an associated torsional flex pivot of said second pair of flex pivots, and each of said first pair of rods having an opposite end fixedly attached to diametrically opposite points on said outer support ring member and along said second axis, the torque producing device being rendered effective to cause a torque to be applied to the inner support ring member;

the first pair of torsional flex pivots being effective to permit angular movement of the inner support ring with respect to the outer ring member and about the first axis;

the second pair of torsional flex pivots being effective to permit angular movement of the inner support ring with respect to the outer ring member and about the second axis;

the first pair of flexural support rods being effective to flex upon motion of the inner support ring with respect to the outer ring member about any axis perpendicular to the first axis; and, the second pair of flexural support rods being effective to flex upon motion of the inner support ring with respect to the outer ring member about any axis perpendicular to the second axis, and the first and second pair of flexural support rods flexing upon a motion of the inner support ring in response to the torque being applied by the torque producing device about any axis perpendicular to the first and second axes.

5. A flexural support means comprising:

a movable member, a stationary member for supporting the movable member;

a pair of flexural support rods extending along one axis and fixedly attached to first diametrically opposed points of the stationary member; and a pair of torsional flex pivots attached at second diametrically opposite points of said movable member, each of said flex pivots extending along the one axis and being positioned intermediate the movable member and one of said flexural support rods, the torsional flex pivots extending along the one axis being effective to permit an angular movement of the movable member with respect to the stationary test fixture member and an angular movement thereof about the one axis; and the flexural support rods being effective to bend upon angular movement of the movable member about any axis perpendicular to the one axis.

6. The combination defined by claim 5 wherein:

the movable member includes:

an inner support ring member for pivotally mounting a torque producing device; and the stationary member includes:

an outer frame ring member;

the inner support ring member being attached at said second diametrically opposite points to the pair of torsional flex pivots extending along the one axis; and the outer frame ring member being fixedly attached at said first diametrically opposite points to one end of each of the pair of flexural support rods extending along the one axis, an opposite end of each support rod being fixedly attached to an end of each of the pair of torsional flex pivots.

7. A torque measuring apparatus including the flexural support means defined by claim 5 wherein:

the movable member includes:

an inner support ring member for pivotally mounting a torque producing device; and the stationary member includes:

an outer frame ring member;

the inner support ring member being attached at said second diametrically opposite points to the pair of torsional flex pivots extending along the one axis; and the outer frame ring member being fixedly attached at said first diametrically opposite points to one end of each of the pair of flexural support rods extending along the one axis, an opposite end of each support rod being fixedly attached to an end of each of the pair of torsional flex pivots so as to permit a deflection of the inner support ring member in a sense and of a magnitude corresponding to the torque exerted on the movable member about an axis perpendicular to the one axis by the torque producing device.

8. In a support of a type including a first member, a second member, and means for resiliently supporting the first and second members in a movable relation one to the other; the improvement comprising said supporting means including a flexural support rod and a torsional flexural pivot device serially connected in an operative relation between the first and second members, the flexural pivot device permitting angular movement of one of said members relative to the other member about a first axis, and the flexural support rod being effective to flex upon angular movement of said one member relative to the other member about second and third axes orthogonal one to the other and to said first axis, and the flexure of said support rod being of a magnitude dependent upon the extent of the relative angular movements of said one member about said second and third axes.

9. The improvement defined by claim 8 in which the supporting means includes another flexural support rod and another torsional flexural pivot device serially connected in an operative relation between the first and second members and extending along the second axis perpendicular to said first axis, the other flexural pivot device permitting angular movement of said one member relative to the other member about said second axis, and the flexural support rod being effective to flex upon angular movement of said one member relative to the other member about said first and third axes orthogonal one to the other and to said second axis, and the flexure of said other support rod being of a magnitude dependent upon the extent of the relative angular movements of said one member about said first and third axes.

10. For use in an apparatus to measure torque caused by a torque producing device in response to an electrical command signal; a flexural support structure comprising:
- a movable member for supporting the torque producing device,
- a stationary test fixture member,
- means for resiliently supporting the movable member in a movable relation to the fixture member,
- the resilient supporting means including a flexural support rod and a torsional flexural pivot device serially connected in an operative relation between said members,
- the flexural support rod being connected to one of said members and extending along a first axis,
- the torsional flexural pivot device being connected to the other of said members and extending along the first axis,
- the flexural pivot device permitting angular movement of the movable member with respect to the stationary member about the first axis,
- the flexural support rod being effective to flex upon an adjustment of the position of the movable member with respect to the stationary member about second and third axes orthogonal one to the other and to said first axis, and
- the flexure of said support rod being of a magnitude dependent upon the extent of the relative angular movement of said movable member and stationary member about said second and third axes.

11. In a flexural support apparatus of a type including a first member and a second member, an improvement comprising:
- a flexural support rod having one end attached to one of said members; and
- a torsional flexural pivot device serially connected to an opposite end of the flexural support rod and attached to the other of said members in operative relation between the first and second members;
- the flexural pivot device permitting angular movement of one of said members relative to the other member about a first axis; and
- the flexural support rod being effective to flex upon angular movement of said one member relative to the other member about second and third axes orthogonal one to the other and to said first axis.

12. The combination comprising:
- a first member and a second member,
- flexural means for supporting the first member in movable relation to the second member,
- the flexural means including a flexural support rod attached to one of said members, and
- a torsional flexural pivot device serially connecting the flexural support rod to the other of said members,
- the flexural pivot device permitting angular movement of one of said members relative to the other member about a first axis, and
- the flexural support rod being effective to flex upon angular movement of said one member relative to the other member about second and third axes orthogonal one to the other and to said first axis.

References Cited
UNITED STATES PATENTS

| | | | |
|---|---|---|---|
| 2,860,495 | 11/1958 | Stark | 64—11 |
| 2,966,049 | 12/1960 | Ormond | 64—15 |
| 3,354,726 | 11/1967 | Krupick et al. | 74—5 |
| 3,360,255 | 12/1967 | Ormond | 64—15 |
| 3,420,582 | 1/1969 | Shelley | 308—2 |
| 3,427,828 | 2/1969 | Stiles | 74—5X |

MANUEL A. ANTONAKAS, Primary Examiner

U.S. Cl. X.R.

74—5; 308—2